(12) United States Patent
Davis et al.

(10) Patent No.: US 7,539,782 B2
(45) Date of Patent: May 26, 2009

(54) METHOD OF VIRTUALIZING I/O RESOURCES IN A COMPUTER SYSTEM

(75) Inventors: Brad A. Davis, Lake Oswego, OR (US); Thomas E. Malone, Tigard, OR (US)

(73) Assignee: International Business Machines Corporation, Armonk, NY (US)

( * ) Notice: Subject to any disclaimer, the term of this patent is extended or adjusted under 35 U.S.C. 154(b) by 333 days.

(21) Appl. No.: 11/187,679

(22) Filed: Jul. 22, 2005

(65) Prior Publication Data

US 2005/0257222 A1    Nov. 17, 2005

Related U.S. Application Data

(63) Continuation of application No. 09/930,857, filed on Aug. 15, 2001, now Pat. No. 6,968,398.

(51) Int. Cl.
G06F 3/00 (2006.01)
G06F 13/28 (2006.01)
G06F 9/26 (2006.01)

(52) U.S. Cl. .................. 710/3; 710/9; 710/26; 711/203
(58) Field of Classification Search .................. None
See application file for complete search history.

(56) References Cited

U.S. PATENT DOCUMENTS

| | | | |
|---|---|---|---|
| 3,761,881 A | 9/1973 | Anderson et al. | |
| 3,806,888 A | 4/1974 | Brickman et al. | |
| 4,587,610 A | 5/1986 | Rodman | |
| 5,127,094 A | 6/1992 | Bono | |
| 5,938,765 A | 8/1999 | Dove et al. | |
| 6,212,613 B1 | 4/2001 | Belair | |
| 6,314,501 B1 | 11/2001 | Gulick et al. | |
| 6,314,525 B1 * | 11/2001 | Mahalingham et al. | 714/4 |
| 6,446,188 B1 | 9/2002 | Henderson et al. | |
| 6,470,436 B1 | 10/2002 | Croft et al. | |
| 6,581,130 B1 | 6/2003 | Brinkmann et al. | |
| 2001/0004753 A1 | 6/2001 | Dell et al. | |
| 2002/0069340 A1 * | 6/2002 | Tindal et al. | 711/203 |
| 2002/0103943 A1 | 8/2002 | Lo et al. | |

OTHER PUBLICATIONS

Lovett, T. et al., "Sting: A CC-NUMA Computer System for the Commercial Marketplace," ACM Press, 1996, pp. 308-317.
Hennessy, J. et al., "Computer Organization and Design: The Hardware/Software Interface," Morgan Kaufmann, 1994, Chapter 7.

* cited by examiner

Primary Examiner—Alan Chen
(74) Attorney, Agent, or Firm—Lieberman & Brandsdorfer, LLC

(57) ABSTRACT

A method of virtualizing hardware resources in a multiprocessor computing environment is provided. Each resource is provided a resource address. A hardware resource map is provided to store virtual resource addresses and physical resource addresses. Remapping hardware is utilized to redirect virtual addresses to physical addresses. The method of virtualizing hardware resources may be applied to any resource mapped across the bus, including memory address space, and I/O address space. Accordingly, the method of virtualizing hardware resources through platform firmware enables dynamic routing of resource accesses during runtime.

13 Claims, 11 Drawing Sheets

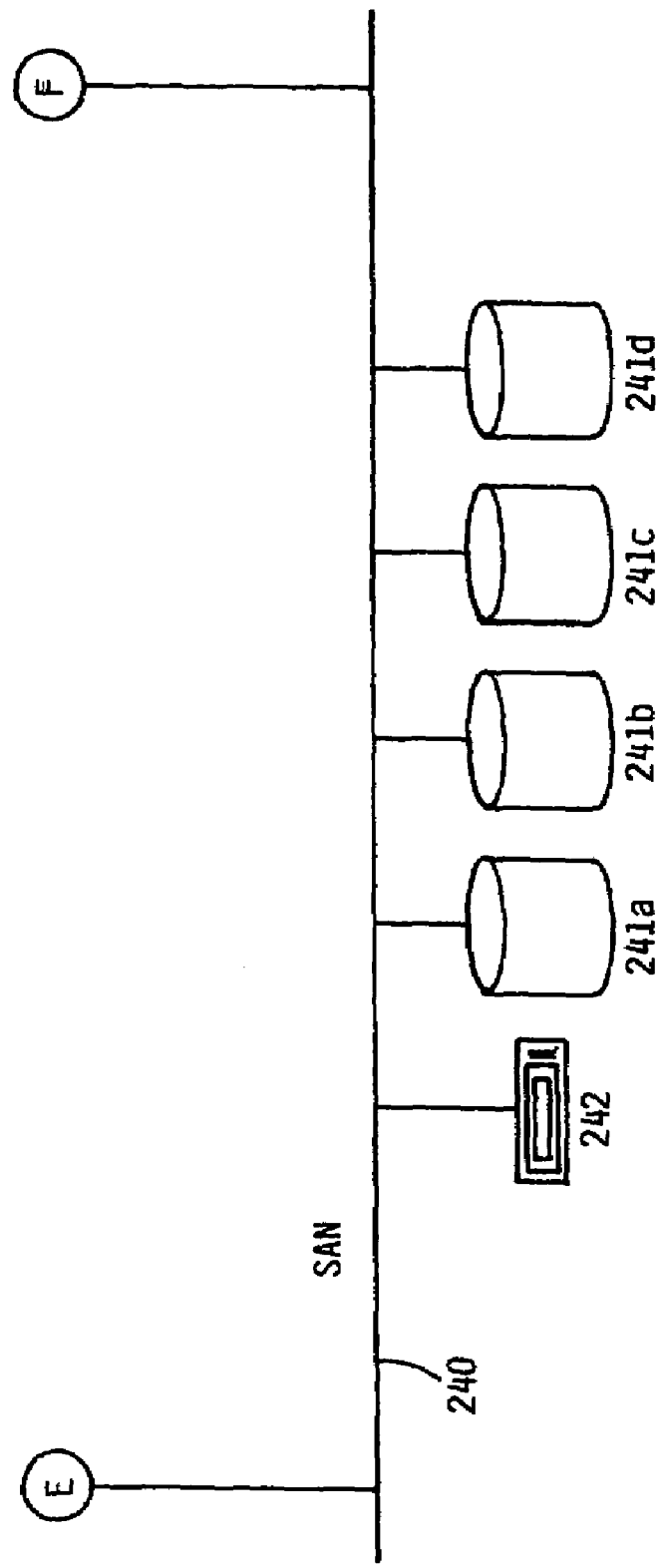

METHOD OF VIRTUALIZING I/O RESOURCES IN A COMPUTER SYSTEM

CROSS REFERENCE TO RELATED APPLICATION(S)

The present application is a continuation of U.S. patent application Ser. No. 09/930,857, Aug. 15, 2001 now U.S. Pat. No. 6,968,398.

BACKGROUND OF THE INVENTION

1. Technical Field

This invention relates to a method of virtualizing hardware resources in a multiprocessor computing environment. More specifically, the invention relates to a method and system for dynamically remapping resources through platform firmware.

2. Description of the Prior Art

In a computing environment, cache memory may serve as a method for providing fast access to recently used portions of a program's code and data. Similarly, the main memory in a computing environment can act as a cache for secondary storage, such as that implemented with magnetic disks. Virtual memory manages the two levels of memory hierarchy represented by the main memory and secondary storage. The virtual memory allows for both efficient sharing of memory among multiple programs and removes the programming burdens represented by a limited fixed amount of main memory. Both the translation of each program's address space and the protection of the address space from other programs are provided by virtual memory hardware. Accordingly, the CPU produces a virtual memory address which is translated by a combination of hardware and software to a physical memory address, which in turn can be used to access main memory, which is also known as memory mapping.

FIG. 1 is a block diagram 10 illustrating the use of virtual memory management of the prior art. The CPU has a plurality of virtual memory addresses 20 used by the operating system and/or application software 23. The virtual address 20 is translated into a physical address 30 through a page table look-up 25. The physical address 30 drives memory decode logic 35 to access the appropriate memory resources 40a-40d. The memory decode logic (e.g. motherboard chipset), while possibly configurable at boot time (e.g. by BIOS), is static in that it does not change at runtime. For example, for a given address, the memory decode logic always selects the same memory device. Accordingly, the page look-up table 25 translates the virtual address of the CPU to a physical memory address under the direction of the operating system 27.

FIG. 2 is a block diagram 45 illustrating the use of I/O addressing in the prior art. The CPU has a plurality of I/O addresses 50, which are assigned to I/O resources 60a-60d at boot time. The CPU I/O address 50 drives I/O decode logic 55 to access the appropriate I/O resource 60a-60d. The I/O decode logic 55 (e.g. motherboard chipset), while possibly being configurable at boot time (e.g. by BIOS), is static in that it does not change at runtime. In some cases, a physical I/O resource may be removed or installed after boot, but the I/O addresses assigned to a given resource is not changed once installed. Accordingly, the prior art I/O addressing is static throughout operation of the system.

Multiprocessor systems contain multiple processors (also referred to herein as "CPUs") that can execute multiple processes or multiple threads within a single process simultaneously in a manner known as parallel computing. In general, multiprocessor systems execute multiple processes or threads faster than conventional single processor systems, such as personal computers, that execute only one thread at a time. Shared memory multiprocessor systems offer a common physical memory address space that all processors can access. Multiple processes therein, or multiple threads within a process, can communicate through shared variables in memory.

Many multiprocessor systems are constructed of a plurality of computational nodes (also known as "building blocks" or "quads"), which can be joined together by system interconnect hardware to form one or more independent computing environments, such environments being known as partitions. At boot time, the firmware of an interconnected computer system configures the system interconnect, assigning addresses to the system's processors, memory, and I/O devices. These address assignments are fixed, each device remaining at a constant address until the system is powered off or rebooted. All these fixed addresses, known collectively as the system's memory and I/O resource maps, are visible to the system's software, and the correct operation of the system depends on the resources being accessible at those fixed addresses.

It is often desirable to change the organization of an interconnected system in response to changing workload or the need to remove hardware for servicing. Further, it is often desirable to divide a lightly loaded partition such that the currently running operating system continues to function, with fewer resources, and the formerly underutilized nodes form a new, independent partition available for other work. However, when a partition is divided, the fixed address resources required by the currently running operating system may include I/O resources located on the nodes being removed. Accordingly, it is desirable to be able to change the I/O resource map at run time so that the fixed addresses known to the operating system may be re-assigned to different nodes at different times.

SUMMARY OF THE INVENTION

It is therefore an object of the invention to virtualize hardware I/O resources in a computer system. It is a further object of the invention to dynamically remap I/O resources through platform firmware.

In one aspect of the invention is a method for accessing hardware resources in a computer system. A first I/O resource is assigned a first physical resource address. A second I/O is assigned a second physical resource address. A hardware resource map logically stores the virtual resource address and at least one of the first and second physical resources addresses. The virtual resource address is dynamically routed between the first and second physical resource addresses. The resource map may be changed during run-time.

In another aspect of the invention is a computer system including platform firmware having both a virtual resource address and a physical resource address. A first I/O resource having a first physical resource address, and a second I/O resource having a second physical resource address are provided. A hardware resource map is provided to logically store the virtual address and at least one of said first and second physical resource addresses. The resource map may be changed during run-time of the system. A resource map manager is provided in conjunction with the resource map to translate the virtual resource address to a physical hardware address.

In yet another aspect of the invention is an article comprising a computer-readable signal bearing medium readable by a computer having multiple nodes. The article includes platform firmware having a virtual resource address and a physical resource address. Means in the medium is provided for logically storing the virtual and physical resource addresses. Means in the medium are also provided for dynamically routing fixed address references. A manager is provided to translate the resource address and to redirect a virtual address to a physical resource address.

Other features and advantages of this invention will become apparent from the following detailed description of the presently preferred embodiment of the invention, taken in conjunction with the accompanying drawings.

DESCRIPTION OF THE PREFERRED EMBODIMENT

Overview

The firmware of an interconnected computer system creates a resource map, assigning addresses to the system's processors, nodes, memory and other I/O devices. In general, the resource map is preprogrammed at the time of booting up the system, and remains static throughout operation of the computer system. In a preferred embodiment of the invention, a hardware resource map is utilized to remap platform resources during run time. The hardware resource map allows the physical resource addresses to be provided by firmware when the operating system refers to the virtual resource.

Technical Background

It is known for system software applications to require specific hardware resources to be maintained at a fixed address. In a high availability platform, the fixed address requirements makes it difficult to substitute a different hardware resource without specific hardware support. Accordingly, it is desirable to provide a system in which I/O and memory resources in the system may be generally interchanged and substituted in a dynamic routing scenario.

Figure 1:
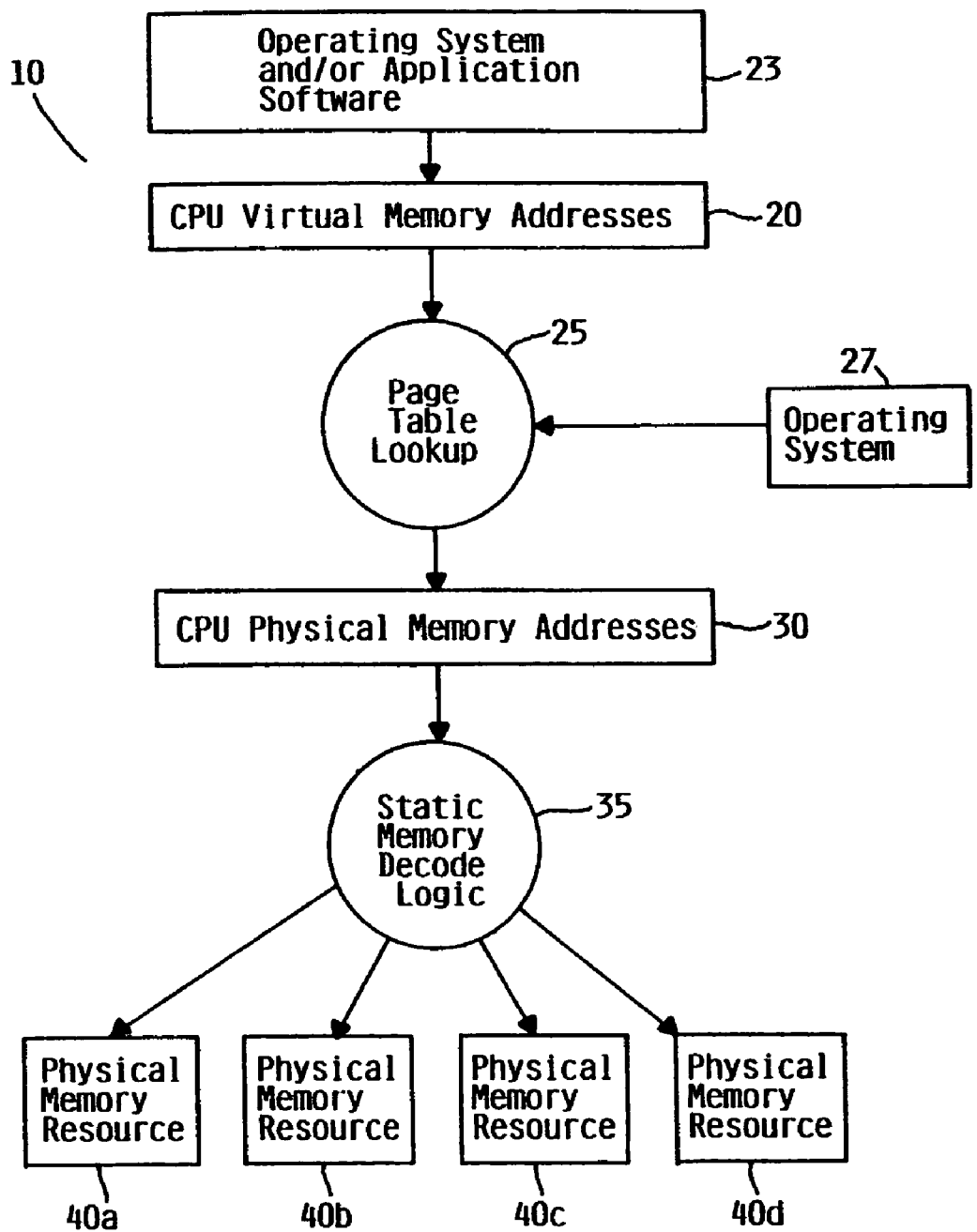
FIG. 1 is a block diagram of a prior art memory path employing virtual memory.
Figure 2:
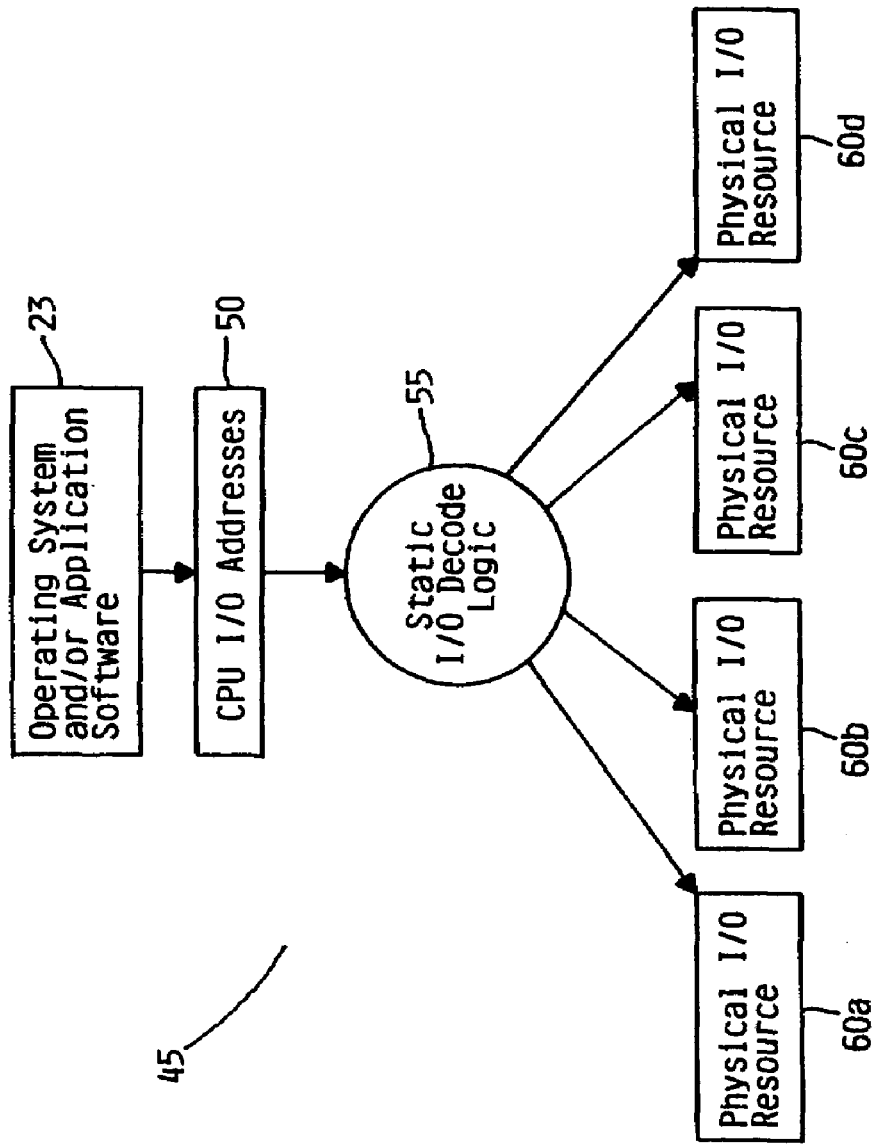
FIG. 2 is a block diagram of a prior art I/O path employing static decode logic.

In the prior art operating systems, mapping of virtual memory addresses to physical memory addresses took place through the use of CPU page tables. A prior art flow diagram illustrating the process of translating virtual memory addresses to physical memory addresses is shown in FIG. 1. The prior art translation system is used in the context of the operating system and memory resources. FIG. 2 is a prior art flow diagram illustrating the process of I/O addressing which does not utilize an address translation. In the preferred embodiment of the invention, mapping of virtual addresses to physical addresses is conducted through platform firmware, and may be applied to Input/Output devices as well as memory resources. The platform firmware provides the ability to map addresses during run time thereby eliminating the need to irrevocably set addresses prior to operation. Accordingly, mapping from a virtual resource to a physical resource during operation allows for redirecting of fixed I/O addresses as well as memory resources.

Figure 3:
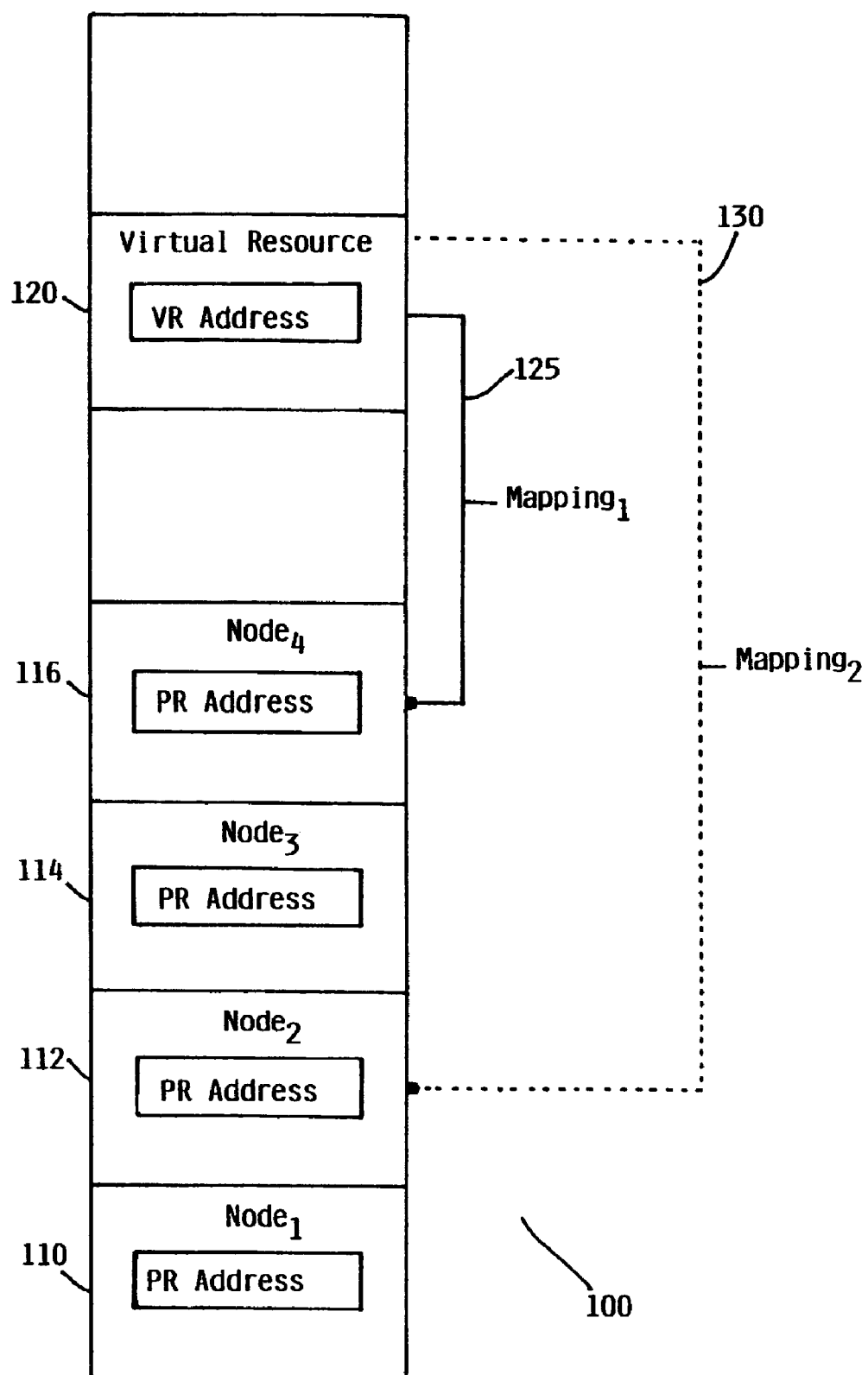
FIG. 3 is a block diagram of a hardware resource map illustrating dynamic mapping of hardware resources.

FIG. 3 is a block diagram of a hardware resource map 100. The map 100 has multiple resources, wherein each of the resources have dedicated addresses. In the example illustrated, the system has four nodes 110, 112, 114 and 116. Each of the nodes 110-116 contains physical resources and has a dedicated address associated with each resource. In addition to the physical resources, a virtual resource 120 is provided. As with each physical resource in nodes 110-116, the virtual resource has a dedicated address. Any resource within the virtual resource 120 may be mapped to any of the physical resources. This allows for an address space to be dedicated instead of physical hardware. FIG. 3 shows two examples of mapping. The first mapping 125 illustrates how the dedicated address of the virtual resource is routed to the physical resource of node four 116. The second mapping 130 illustrates how the dedicated address of the virtual resource may be routed to the physical resource of node 112 at a different time. In both of these examples, all accesses to the virtual resource are forwarded to the physical resource address of the mapped node. In a 64 bit address system, the availability of addresses is plentiful. It is less costly to dedicate an address space to a virtual resource than to provide the physical resource. Accordingly, the hardware resource map functions as a guide for translating between virtual resource addresses and physical resources.

The hardware resource map provides the ability to reallocate resources during run-time of the system. A fixed address known to the operating system may be re-assigned to different nodes at different times. In addition, a fixed address resource can be reallocated from a virtual resource to a physical resource under the same premise. The hardware resource map is designed to operate within the firmware platform environment. The firmware provides another layer of operation underneath the operating system. Accordingly, the hardware resource map in a system provides enhanced flexibility and reliability to the system.

Figure 4:
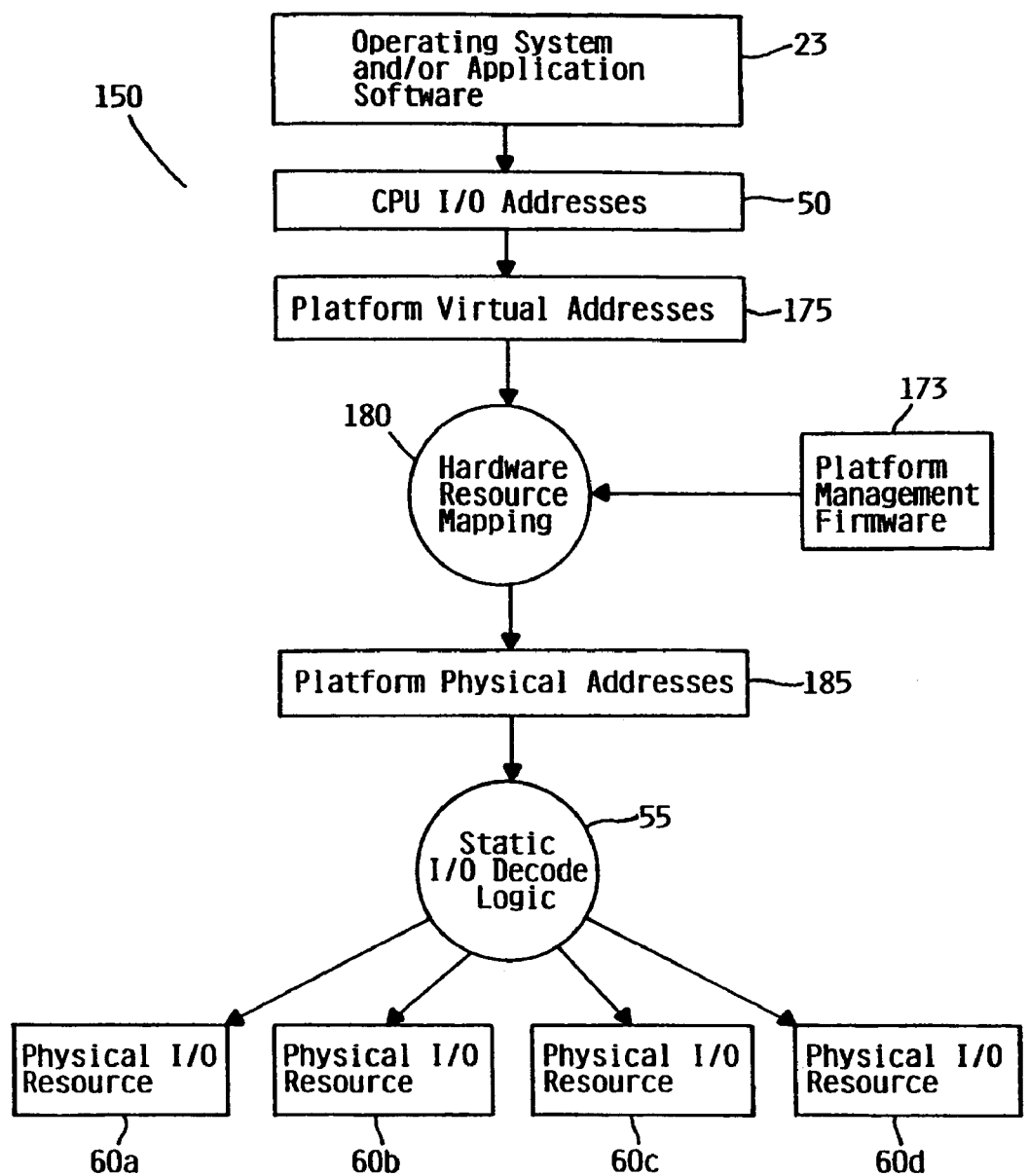
FIG. 4 is block diagram of an I/O path employing a hardware resource map in a system according to the preferred embodiment of this invention, and is suggested for printing on the first page of the issued patent.
Figure 5A:
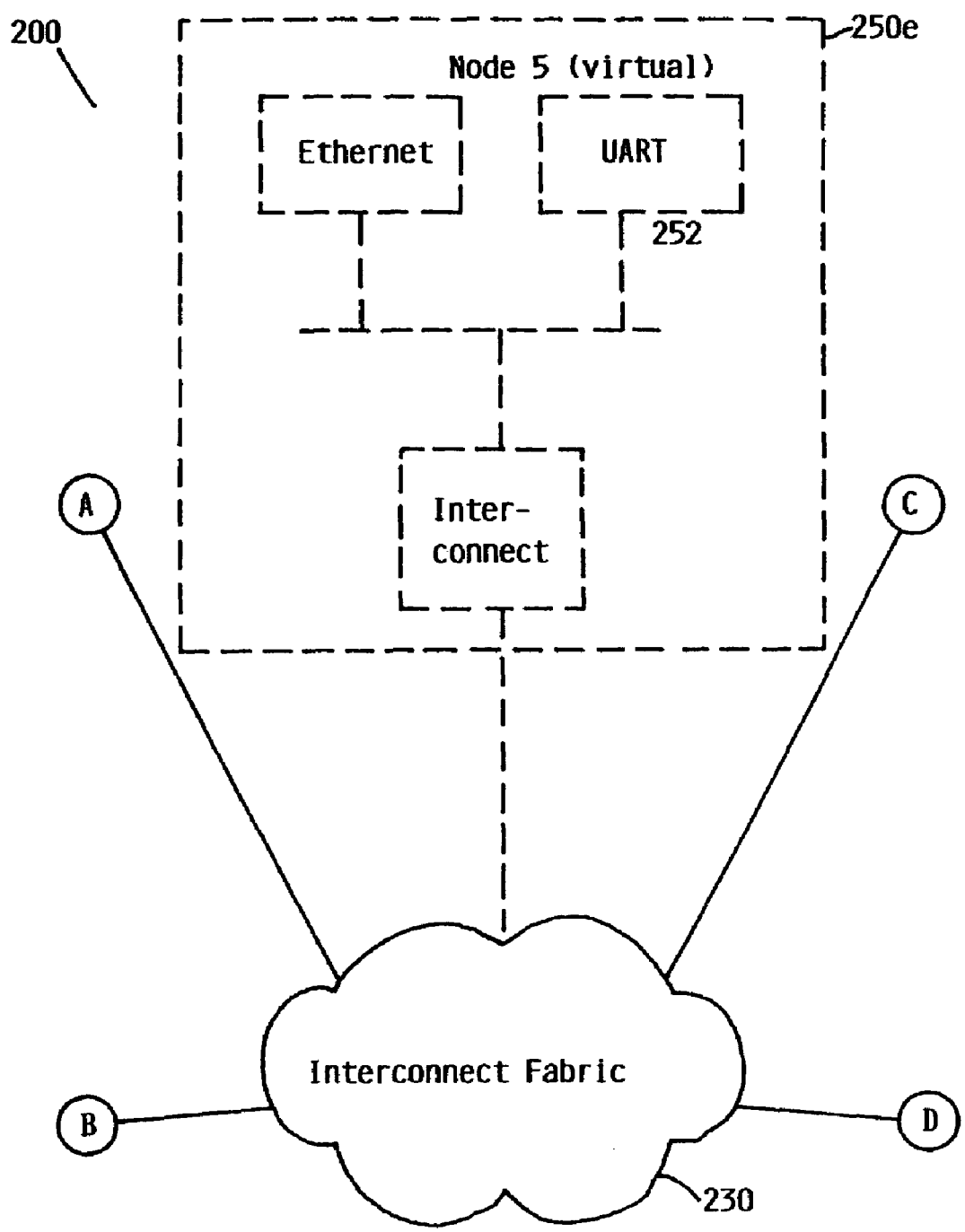
FIG. 5 is a block diagram of an interconnected system employing a resource map.
Figure 5B:
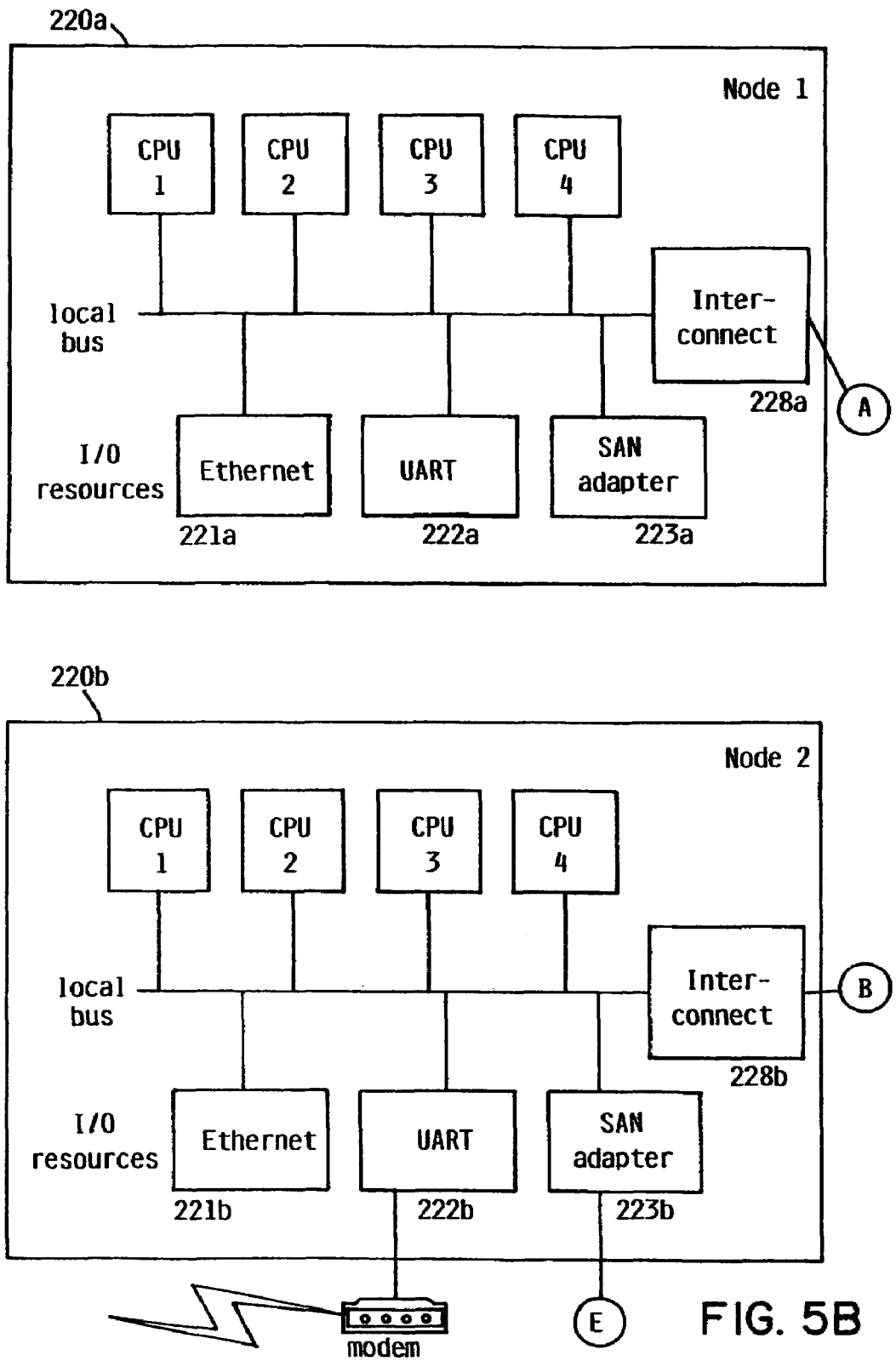
Figure 5C:
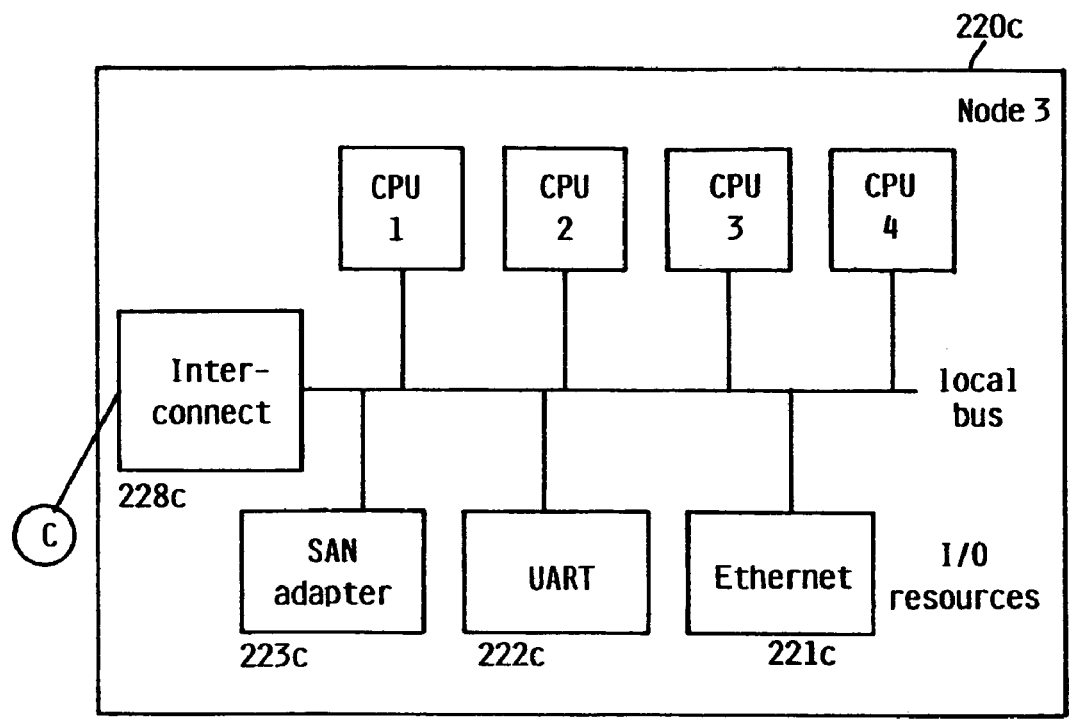
Figure 5C:
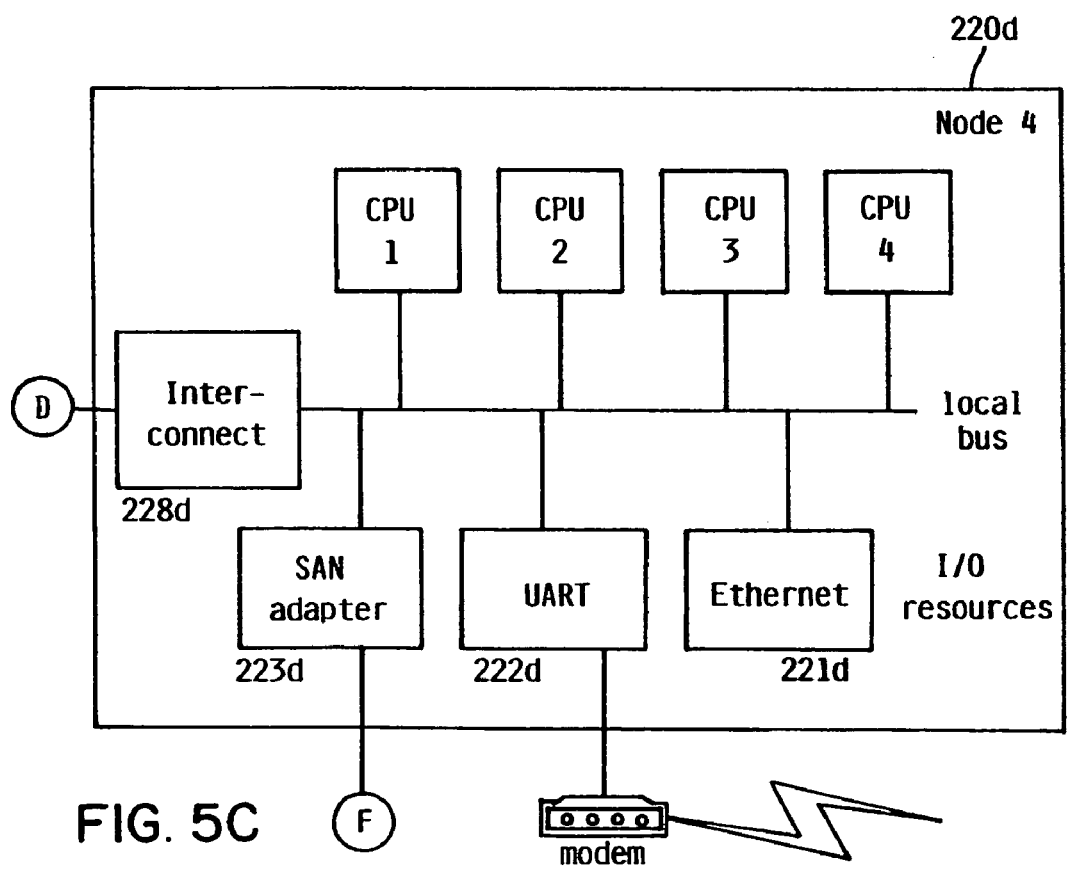

FIG. 4 is a block diagram 150 illustrating the integration of the hardware resource map 180 into a computer system's I/O path. The prior art CPU I/O addresses 50 remains in the system as this is the interface between the CPU and the I/O path. The static I/O decode logic 55 and the physical I/O devices 60a-60d also remain unchanged. However, a resource mapping translation 180 of the addresses 175 has been added, providing for firmware control of the selection of I/O devices 60a-60d. This provides a layer of I/O addresses underneath the operating system 23 that is only accessible by the platform management firmware 173. The mapping application occurs in the firmware in absence of or invisible to the operating system software to add control of the system by the platform management. As shown in FIG. 4, the platform management firmware 173 has a plurality of virtual addresses 175, similar to the operating system 27. Following the presentation of the I/O addresses by the CPU, the I/O address 50 is used as the platform virtual address 175. The system has a plurality of virtual addresses 175 used by the platform management firmware. The platform virtual address 175 is translated into a platform physical address 185 through a virtual hardware mapping 180. Following the address translation, the address is processed through static I/O decode logic 55 and/or a system interconnect to reach the physical I/O resource 60a-60d. The use of the hardware resource mapping 180 of the platform management firmware 173 removes the need of mapping through the bus and maintains the mapping within the firmware environment. Accordingly, the hardware resource map may be utilized in combination with a system interconnect to expand system resources.

As shown in FIG. 3, the resource map 100 provides for translation of virtual and physical resources through the respective address locations. The hardware resource map 100 acts as a roadmap for the firmware layer of management. One example for utilization of the hardware virtualization is renumbering of nodes in an existing resource map. In the situation where it is necessary to conduct an on-line replacement of hardware components within a specific node, it is not always desirable to shut-down the entire system to service the "handicapped" node. A substitute node may be added to the hardware resource map, and the substitute node may be configured as a duplicate of one or more of the existing nodes. The firmware can replicate data from the handicapped node into the virtual node, while the operating system is in a frozen state. In addition, the hardware resource map in each other node is updated to reference the replacement node instead of the handicapped node. When the operating system is released from the frozen state, all of the critical data structures from the handicapped node are intact. However, the critical data structures from the handicapped node are now located in the replacement node. The handicapped node is now idle and can be powered down and removed from the system for repair and/or replacement. Reassignment of nodes in an interconnected system is just one application of the hardware virtualization. Accordingly, the hardware resource map provides the ability to conduct on-line replacement of resources while allowing the system to continue operation.

Another example where such an embodiment is beneficial is a high availability I/O device, such as a UART (serial port). The Windows NT® headless console requires a high availability UART to always be present, and also requires the UART to be at a fixed address. A given partition in a system may have several UARTs available. However, since Windows NT® requires the UART to always be present at a fixed address, this address must be irrevocably selected prior to booting up the operating system. It is therefore desirable to create a virtual UART. A virtual resource may be assigned in the hardware resource map that will maintain an available UART. Accordingly, if the operating system is looking for the available UART, one will always be available, and the available UART may be accessed through the hardware resource map.

Figure 6A:
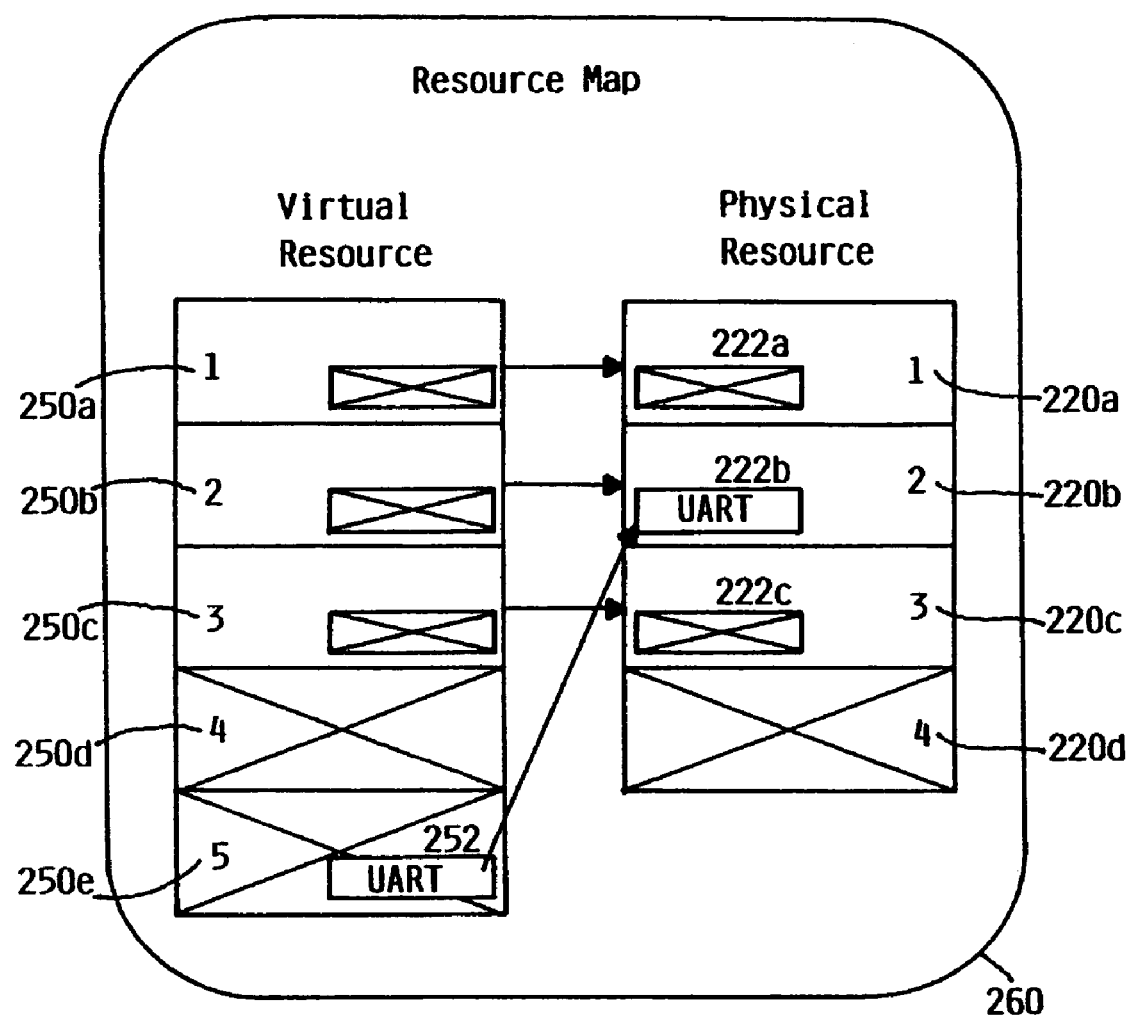
FIG. 6a is a block diagram of a resource map for a partition on the system of FIG. 5, configured with three physical nodes and a virtual UART, the virtual UART being mapped to a physical UART in physical node 2.
Figure 6B:
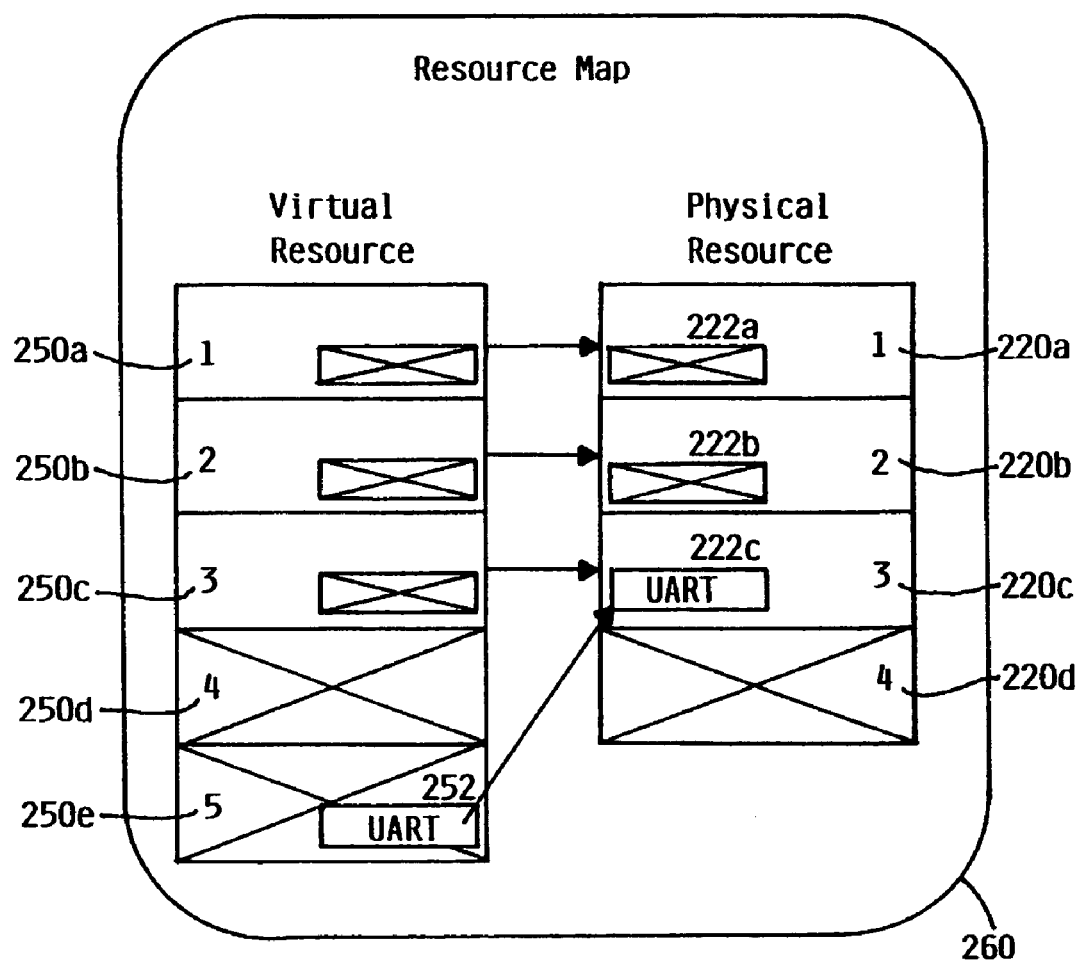
FIG. 6b is the resource map of FIG. 6a, after the virtual UART has been remapped to the physical UART in physical node 3.
Figure 6C:
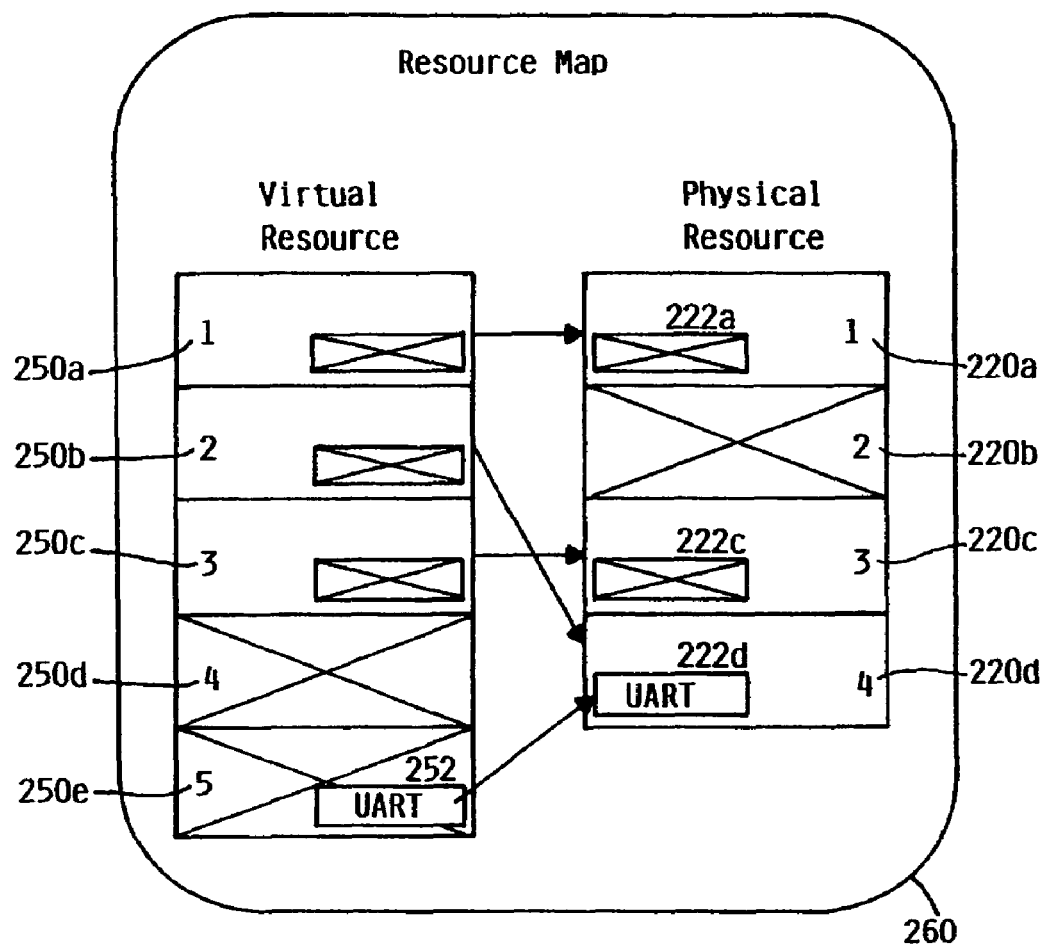
FIG. 6c is the resource map of FIG. 6a, after physical node 2 has been replaced with physical node 4.

FIG. 5 is a block diagram of a computer system employing a hardware resource map of the invention. The system 200 has four computational nodes 220a-220d linked by interconnect circuitry 228a-228d and an interconnect fabric 230. The nodes include a number of I/O resources, including ethernet adapters 221a-221d, UARTs 222a-222d, and storage area network (SAN) adapters 223a-223d. The storage area network links a number of data storage resources including drives 241a-241d and a tape drive 242. Platform management implements a hardware resource map for each partition by configuring the interconnect circuitry 228a-228d and interconnect fabric to route references FIGS. 6a-6c are block diagrams of the resource map 260 for a partition of the system shown in FIG. 5. In these diagrams, the platform management is shown organizing three of the nodes 220a-220c into a highly available partition while maintaining the fourth physical node 220d in reserve. A virtual node 250e is created to host highly available resources. FIG. 6a depicts the hardware resource map 260 created for the partition. The resource map 260 includes virtual resource address space for five nodes 250a-250e. The first three virtual resource addresses 250a-250c are shown directly mapped to hardware resources at addresses 220a-220c. The fourth virtual resource address 250d in the resource map 260 is shown not being utilized. The space 250d is reserved address space in case the partition should need to be expanded at runtime. The fifth virtual resource at address 250e in the resource map 260 is also mostly not utilized. In fact, the fifth virtual resource at address 250e contains a virtual UART 252 exposed to the partition's operating system. Each of the hardware resources at addresses 220a-220c are shown with UARTs 222a-222c, respectively. The operating system will map the virtual UART 252 to whichever hardware resource address the platform management designates. In FIG. 6a, the virtual UART 252 is mapped to the physical UART 222b in the second hardware resource at address 220b. Accordingly, the interconnect circuitry and interconnect fabric are configured such that accesses to the address space of the virtual UART 252 are routed to physical UART 222b in the second hardware resource at address 220b.

The preferred embodiment of the invention enables substitution for a fixed address device during system operation. FIG. 6a is an illustration of a resource map 260 for the system 200 of FIG. 5. There are four hardware resource addresses 220a-220d and five virtual resource addresses 250a-250e. The virtual resource addresses 250a-250c are directly mapped to physical resource addresses 220a-220c. Virtual resource address 250e with an additional UART is shown with the UART 252 mapped to physical resource address at 220b. Platform management can be used to modify the resource map 260. As shown in FIG. 6b, the resource map 260 is modified to substitute a new physical UART 222c for the virtual UART 252 at physical resource address 220c. Previously, the UART 252 of the virtual node address 250e was mapped to the physical resource address 220b. With the system reconfigured according to the new resource map shown in FIG. 6b, platform management has accomplished the desired substitution without disturbing the running operating system. Accordingly, the resource map enables substituting a fixed address device and recognition of substitute device addresses during run-time.

Another advantage of the invention is apparent when a fault occurs during system operation, or when it is desirable to remove an entire node from a system for service. For example, again consider the system 200 of FIG. 5, configured with the resource map 260 of FIG. 6a. In this example, the second physical resource at address 220b encounters a fault. Platform management firmware is able to modify the resource map to replace the failing hardware resource at address 220b with the fourth physical resource at address 220d, as shown in FIG. 6c. The data of the second hardware resource at address 220b is transferred to the fourth physical resource at address 220d. In addition, the available UART 252 in the virtual resource at address 250e is reassigned to the fourth hardware resource at address 220d. FIG. 6c illustrates the reconfiguration of the resource map 260. The operating system is able to continue it's function without experiencing a loss of data, and without having to physically shutdown and restart the system. The resource map 260 maintains the integrity of the data without compromising system performance. Accordingly, the hardware resource map allows firmware to change mapping and interconnect routing based upon availability, as well as dedicate address space for resources that require high availability.

Advantages Over the Prior Art

The preferred embodiment provides a hardware resource map for controlling resource access through platform firmware. The prior art system provided a page table look up for translating virtual memory addresses to physical memory addresses that are set by the operating system. There is no provision within the operating system layer to provide for platform firmware modifications to the virtual and physical addresses. In the invention, the platform firmware accesses the hardware resource map and routes I/O and/or memory accesses between a virtual resource and a physical resource. The remapping occurs at run-time and outside the premise of the operating system. This allows for remapping of resources that are temporarily off-line for replacement, or for hardware that has a high availability requirement. Accordingly, the preferred embodiment utilizes a hardware remapping to dynamically route fixed addresses to provide an optimal programming environment.

Alternative Embodiments

It will be appreciated that, although specific embodiments of the invention have been described herein for purposes of illustration, various modifications may be made without departing from the spirit and scope of the invention. In particular, the invention is not limited to remapping of I/O resources. The hardware resource map may also be used to route memory resources, thereby providing memory resources that are always accessible. In addition, the hardware resource map may be used for anything else that is mapped across the bus. The hardware resource mapping could be integrated with a cache, or into the logic of a system interconnect. The combination of the hardware resource map in conjunction with the system interconnect adds control of platform management in an environment separate from the operating system. The invention is not limited to use in a multiprocessor environment. Rather, it can be implemented in a uni-processor with routing capability. In addition, the system may be applied to a NUMA interconnect, as well as any system capable of routing virtual resource addresses between physical resources which includes I/O resources. Accordingly, the scope of protection of this invention is limited only by the following claims and their equivalents.

We claim:

1. A method for accessing hardware resources in a computer system, comprising:
    attaching a first resource at a first physical resource address, said first physical address providing information about a physical location of said first resource;
    creating a virtual resource with an associated fixed virtual address, said virtual address known to an operating system;
    mapping said virtual address to said first physical resource; during system operation, and responsive to a reorganization of said computer system, remapping said virtual resource to a second physical resource attached at a second physical resource address; and
    said remapping being performed by dynamically routing said virtual resource address between said first and second physical resource addresses through platform firmware.

2. The method of claim 1, wherein the step of dynamically routing said virtual resource address includes providing a hardware resource map for logically storing said virtual resource address and at least one of said first and second physical resource addresses.

3. The method of claim 1, wherein the step of dynamically routing said virtual resource address includes changing a hardware resource map at run time.

4. The method of claim 1, wherein the physical resource addresses are on different nodes of the computer system.

5. The method of claim 1, wherein the system is a multi-processor system including at least two nodes each having at least one processor.

6. The method of claim 1, wherein the step of dynamically routing said virtual resource address includes mapping said virtual resource address to said physical resource address using firmware of said system.

7. The method of claim 1, wherein the step of dynamically routing said virtual resource address includes using a system interconnect.

8. The method of claim 7, wherein the system interconnect is a NUMA interconnect.

9. The method of claim 8, wherein the step of dynamically routing said virtual resource address includes mapping said virtual resource address to said physical resource address using firmware of said interconnect.

10. The method of claim 1, wherein the first I/O resource and a non-I/O resource are collectively assigned said first physical resource address.

11. The method of claim 1, further comprising allowing continuous system operation during the step of dynamically routing addresses.

12. A method for accessing hardware resources in a computer system, comprising:
    creating a virtual I/O resource with an associated virtual address;
    mapping the virtual address to a first physical I/O resource having a first physical address;
    remapping said virtual I/O resource to a second physical I/O resource attached at a second physical resource address; and
    said remapping being performed by dynamically redirecting the virtual I/O resource to the second physical address through firmware with continued system operation.

13. The method of claim 1, wherein said first and second physical resources are selected from the group consisting of: memory resource and I/O resource.

* * * * *